US011801806B2

(12) United States Patent
Whikehart et al.

(10) Patent No.: US 11,801,806 B2
(45) Date of Patent: Oct. 31, 2023

(54) OBJECT DETECTION SYSTEM FOR A VEHICLE

(71) Applicant: VISTEON GLOBAL TECHNOLOGIES, INC., Van Buren Township, MI (US)

(72) Inventors: John William Whikehart, Northville, MI (US); Vijay Nadkarni, San Jose, CA (US); Michael K Ingrody, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1145 days.

(21) Appl. No.: 16/402,927

(22) Filed: May 3, 2019

(65) Prior Publication Data

US 2020/0346621 A1  Nov. 5, 2020

(51) Int. Cl.
*B60S 1/08* (2006.01)
*B60R 16/02* (2006.01)

(52) U.S. Cl.
CPC ............. *B60S 1/0862* (2013.01); *B60R 16/02* (2013.01)

(58) Field of Classification Search
CPC .... B60S 1/0896; B60S 1/0822; B60S 1/0862; B60S 1/0859; B60R 16/02; G06V 20/59
USPC .......................................................... 701/49
See application file for complete search history.

(56) References Cited

U.S. PATENT DOCUMENTS

2016/0121855 A1\* 5/2016 Doorley ..................... B60S 1/56
　　　　　　　　　　　　　　　　　　　　　　　15/250.01
2016/0375863 A1\* 12/2016 Carlsson ............... B60S 1/0862
　　　　　　　　　　　　　　　　　　　　　　　701/49

\* cited by examiner

Primary Examiner — Katina N. Henson
(74) Attorney, Agent, or Firm — Quinn IP Law

(57) ABSTRACT

An object detection system may include an object detecting device. The object detecting device may generate an object signal based on detecting an object. The object detection system may include a controller for operating a motor. The motor may be connected to a wiper element. The controller may generate a position signal based on a position of the motor. The object detection system may include an object detection module in communication with the object detecting device. The object detection module may receive the object signal and/or the position signal. The object detection system may be configured to selectively control the motor in response to detecting the object.

9 Claims, 7 Drawing Sheets

OBJECT DETECTION SYSTEM FOR A VEHICLE

BACKGROUND

Windshield wipers may be used on a vehicle to remove precipitation (e.g., rain, snow) or debris (e.g., dirt) from a windshield of the vehicle. Windshield wipers typically move from side to side or "cross-car," moving in a line of vision of an occupant of the vehicle, such as a driver. Windshield wipers typically are powered by an electric motor located at the base of the windshield. As the electric motor rotates, a linkage joining the windshield wipers may cause the windshield wipers to move in unison. The electric motor driving the windshield wipers is controlled by a manual driver-operated switch, or in some vehicles, an electronic rain sensor. The electronic rain sensor may be located on an interior side of the windshield and may detect the presence of precipitation on the windshield.

SUMMARY

Aspects of the disclosed embodiments may include an object detection system for a vehicle. The object detection system may include an object detecting device for generating an object signal. The object detecting device may generate the object signal based on detecting an object. The object detection system may include a windshield wiper controller for operating a windshield wiper motor. The windshield wiper motor may be connected to a windshield wiper. The windshield wiper controller may generate a position signal based on a position of the windshield wiper. The object detection system may include an object detection module in communication with the object detecting device. The object detection module may be in communication with the windshield wiper controller. The object detection module may receive the object signal and the position signal. The object detection module may selectively control the windshield wiper motor in response to the object signal and the position signal. The object detection module may generate an environmental model that includes a representation, such as a graphical representation, of the object.

Other aspects of the disclosed embodiments may include a method for detecting an object. The method may include detecting the object within a field of view of an object detecting device. The object detecting device may detect the object within the field of view. The method may also include generating, via the object detecting device, an object signal in response to the detecting of the object. The method may also include operating, via a windshield wiper controller, a windshield wiper motor. The method may include generating, via the windshield wiper controller, a position signal based on the operating of the windshield wiper motor. The method may also include identifying, via an object detection module, the object based on the object signal or the position signal. The method may also include selectively controlling, via the object detection module, the windshield wiper motor in response to the identifying the object.

Other aspects of the disclosed embodiments may include a non-transitory computer-readable medium containing program instructions that, when executed by a processor, cause the processor to identify an object. For identifying the object, the processor may perform one or more steps. The processor may detect the object, via an object detecting device. The processor may generate, via the object detecting device, an object signal in response to the object detecting device detecting the object. The processor may communicate between the object detecting device and an object detection module. The processor may operate, via a windshield wiper controller, a windshield wiper motor. The processor may generate, via the windshield wiper controller, a position signal based on a position of the windshield wiper motor. The processor may communicate between the windshield wiper controller and the object detection module. The processor may identify, via the object detection module, the object based on the object signal, the position signal, or both the object signal and the positon signal. The processor may selectively control, via the object detection module communicating with the windshield wiper controller, the windshield wiper motor.

BRIEF DESCRIPTION OF THE DRAWINGS

Further details, features, and advantages of designs of the invention result from the following description of embodiment examples in reference to the associated drawings. It is emphasized that, according to common practice, the various features of the drawings are not to-scale. On the contrary, the dimensions of the various features are arbitrarily expanded or reduced for clarity.

DETAILED DESCRIPTION

Figure 1:
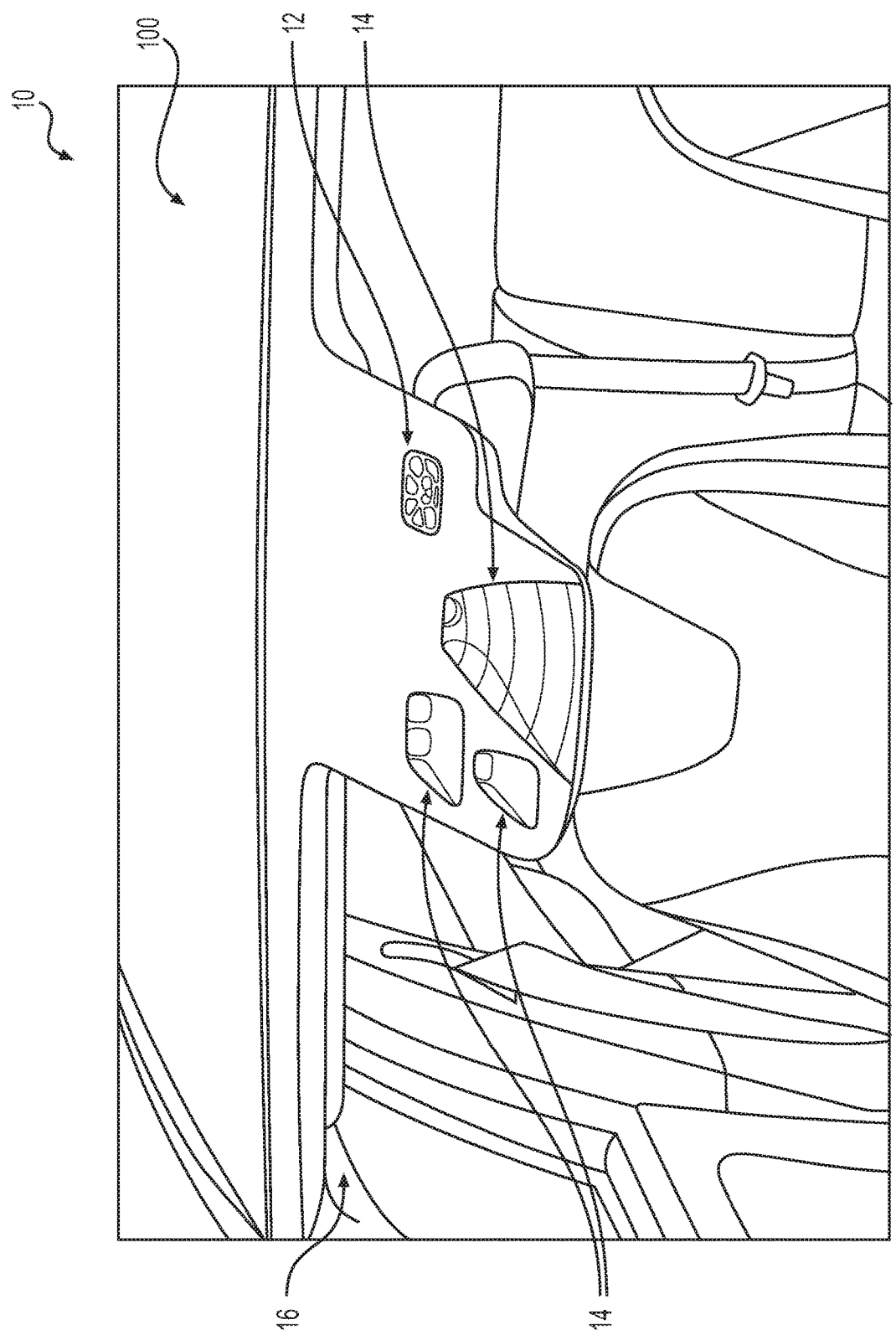
FIGS. 1 and 2 generally illustrate perspective views, from exterior viewpoints, of a vehicle having an object detection system, according to one or more embodiments of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Recurring features are marked with identical reference numerals in the figures. An object detection system 10 is disclosed. The object detection system 10 may be used, for example, in a vehicle 100 to detect oncoming or approaching objects and/or for an autonomous or advanced driver assistance system of the vehicle 100.

Figure 2:
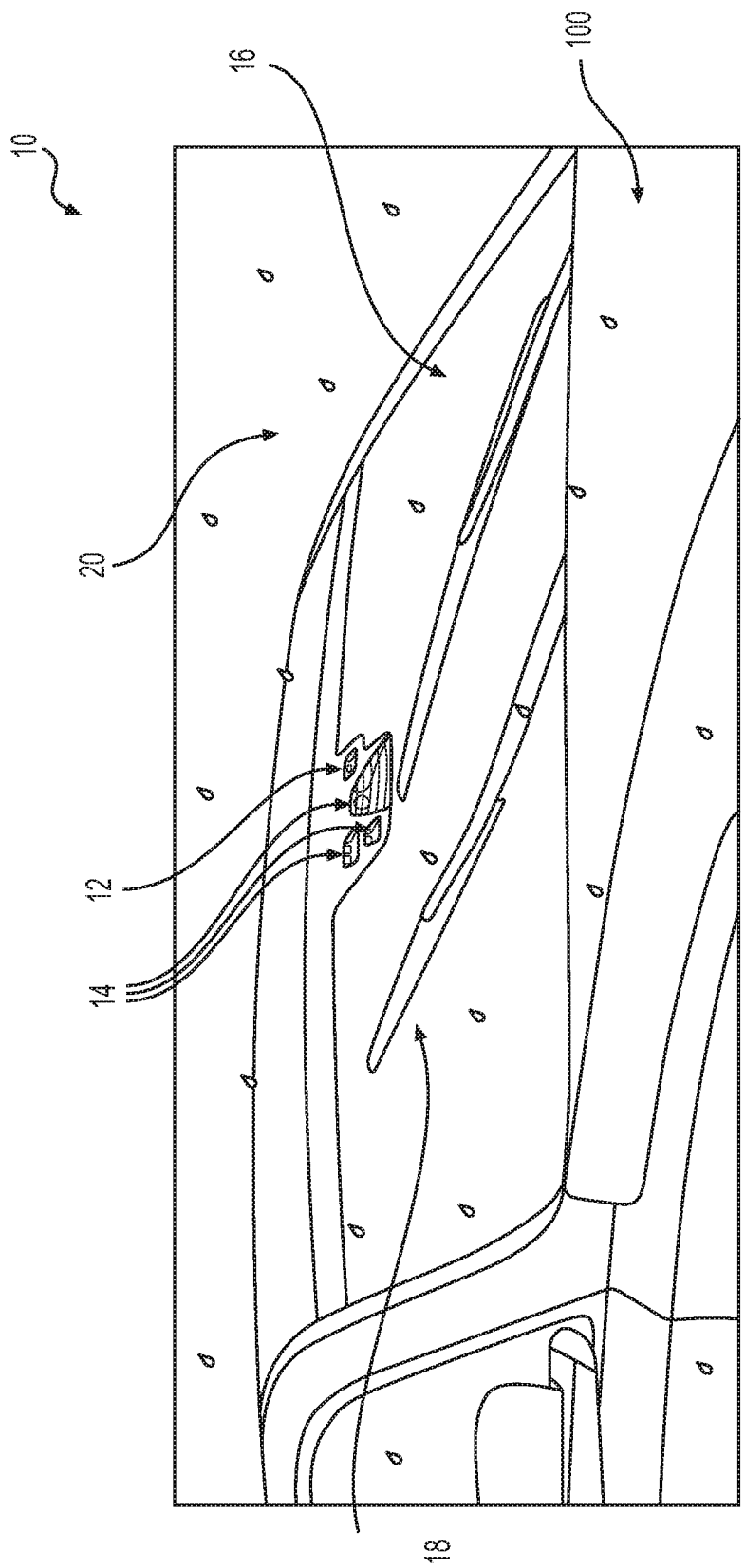

As illustrated in FIGS. 1 and 2, an example embodiment of the object detection system 10 includes a rain sensor 12 and an object detecting device 14. The rain sensor 12 may include a single sensor or a plurality of sensors for sensing precipitation. The object detecting device 14 may be a single detection device or a plurality of detection devices for detecting an object. The rain sensor 12 and/or the object detecting device 14 may be located behind a protective cover, such as a windshield 16 of the vehicle 100. It is understood that the object detecting device 14 may be, for example and without limitation, a camera (e.g., an imaging device), a RADAR (radio detection and ranging) device, and/or a LIDAR (light detection and ranging) device, or a combination thereof.

FIG. 2 generally illustrates an example of an operational mode of the object detection system 10 of FIG. 1. The rain sensor 12 is configured to detect the presence of precipitation, such as rain 20 (though other precipitation and/or debris is contemplated), on the windshield 16 of the vehicle 100. In response to detecting the presence of rain 20, the rain sensor 12 sends a signal to operate windshield wipers 18 of the vehicle 100. While FIG. 2 illustrates the windshield wipers 18 including two windshield wipers, it is understood that in alternative embodiments the vehicle 100 may only have a single windshield wiper or a plurality of windshield wipers (e.g., more than two windshield wipers).

During operation, the windshield wipers 18 include a "sweep" (e.g., a clearing path) for removing precipitation, such as rain 20, from the windshield 16 of the vehicle 100. The sweep of the windshield wipers 18 may include an area of the windshield 16 that covers the rain sensor 12 and/or object detecting device 14. The presence of the windshield wipers 18 in front of the object detecting device 14 may cause challenges for the object detection system 10.

The object detecting device 14 detects objects in front of the object detecting device 14. The objects may, at times during operation of the windshield wipers 18, include a portion of the windshield wipers 18. The objects, detected by the object detecting device 14, are processed by an object detection module 36. For example, in FIG. 3, a pedestrian 24 is shown walking across a street 26 in front of the vehicle 100, and the windshield wipers 18 are in operation, clearing at least a portion of the windshield 16, including in front of the rain sensor 12 and the object detecting device 14. The object detecting device 14 may detect the pedestrian 24 and the windshield wipers 18 as objects.

Figure 3:
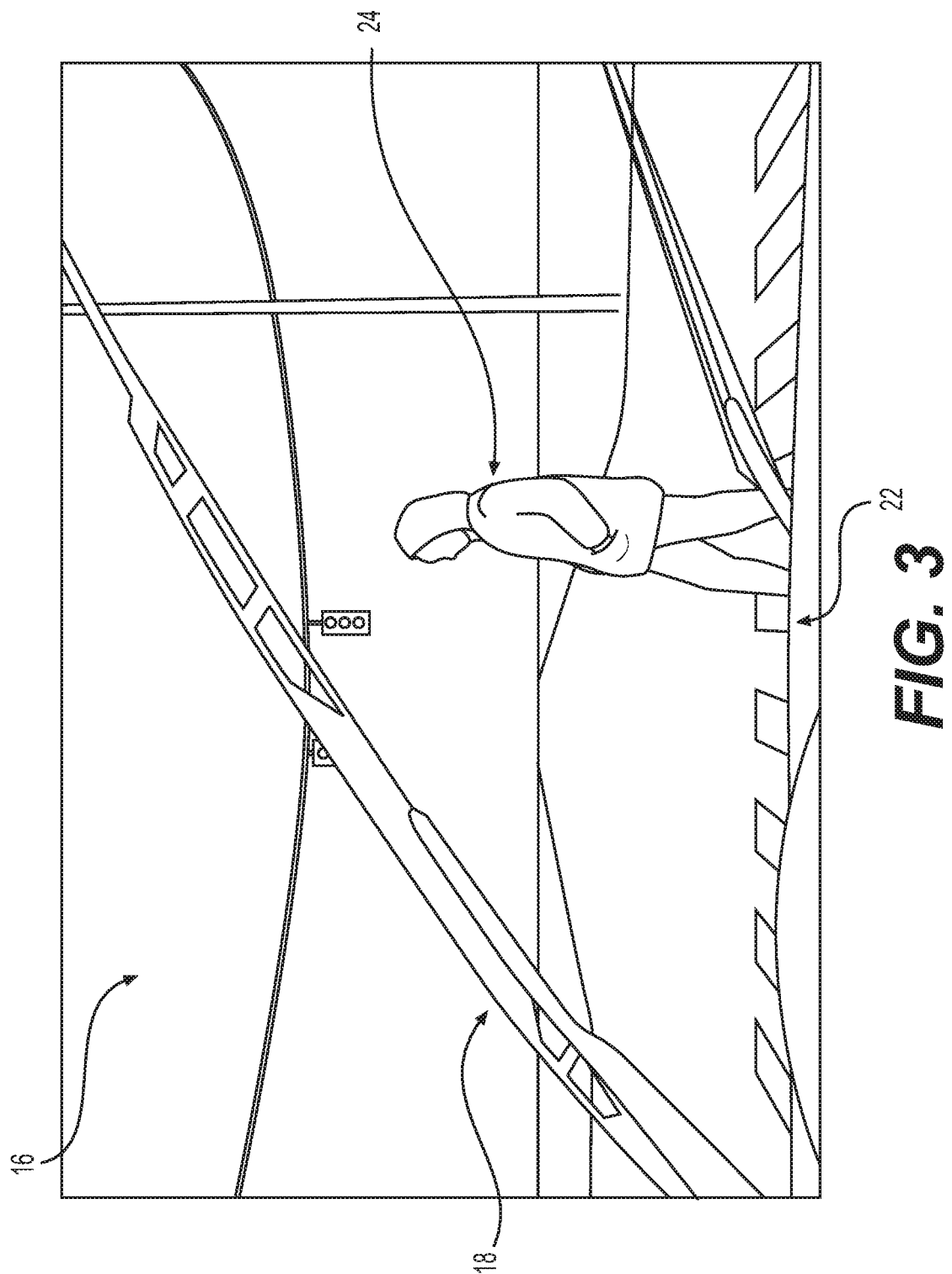
FIG. 3 generally illustrates a perspective view, from an interior viewpoint, of the vehicle having the object detection system from FIGS. 1 and 2, which is in accordance with one or more embodiments of the present disclosure.

The object detecting device 14, detecting one or more objects of the street scene shown in FIG. 3, provides the objects, via data representing the objects, to the object detection module 36. The object detection module 36 may, however, have difficulty identifying the pedestrian 24 when the windshield wipers 18 occlude at least a portion of a field of view 38 of the object detecting device 14.

When the windshield wipers 18 occlude the field of view 38, the object detection module 36 may be unable to identify the pedestrian 24. This may result, in the case of the vehicle 100 being autonomous or semi-autonomous, in the vehicle 100 maintaining a current trajectory, which may cause the vehicle 100 startle or collide with the pedestrian 24. Additionally, or alternatively, the vehicle 100, in the case of the vehicle 100 being autonomous or semi-autonomous, may determine turn over control to a driver of the vehicle 100 if the object detection module 36 is unable to identify the pedestrian 24 (e.g., as a failsafe measure), Further, misidentification or inconclusive identification of the pedestrian 24, by the object detection module 36, may result in an error condition for the vehicle 100. In the error condition, the object detecting device 14, such as through the object detection module 36, may issue an alert signal. The alert signal may be sent from the object detecting device 14, such as from the object detection module 36, to one or more systems of the vehicle 100, such as an advanced driver assistance system.

The alert signal may cause the vehicle 100, such as through the advanced driver assistance system, to perform an evasive maneuver. The evasive maneuver may be performed to try to avoid the misidentified object, due to the windshield wipers 18 occluding the object detecting device 14. As part of the evasive maneuver, the vehicle 100 may abruptly change course, one or more times, within a relatively short period (e.g., within seconds), and/or cause the vehicle to brake, such as via a braking system of the vehicle 100.

When the windshield wipers 18 are occluding the objet detecting device 14, the vehicle 100 may return to a normal condition and/or the object detection module 36 may accurately identify the pedestrian 24 and take appropriate action, such as an appropriate evasive maneuver, stopping the vehicle 100, alerting the driver, turning control over to the driver, other suitable action, or a combination thereof. The normal condition may result from the object detecting device 14, such as through the object detection module 36, issuing an update signal that effectively cancels the alert signal. The update signal may be sent from the object detecting device 14, such as from the object detection module 36, to one or more systems of the vehicle 100. However, based on the operation of the windshield wipers 18, a disruptive pattern for operation of the vehicle 100 may result, such as by abruptly and repeatedly changing between the error condition and the normal condition. This may result in an unpleasant ride experience for an occupant of the vehicle 100.

The object detection module 36, therefore, needs to be aware of the operation and location of the windshield wipers 18 of the vehicle 100 so that the object detection module 36 may disregard (e.g., "look past") the windshield wiper 18, much as a human operator does when driving with the windshield wipers 18 operating. As will be described, the object detection module 36 is configured to control a position of the windshield wipers 18 in order to prevent the windshield wipers 18 from occluding the object detecting device 14, while the object detecting device 14 is detecting an object in front of the vehicle 100 (e.g., while the pedestrian 24 is walking across the street 26). The object detection module 36 may process detected objects to create (e.g., generate), a real-time environmental model. The real-time environmental model may include three-dimensional digital representations of detected objects, including the positions of the objects relative to the vehicle 100.

In one or more embodiments, the object detection module 36 may include an artificial intelligence module, such as a machine learning module, an expert systems module, or other suitable artificial intelligence module. For example, the object detection module 36 may include a machine learning module that includes a convolutional neural network, or other suitable machine learning module or network.

The machine learning module may provide a plurality of images as training input for a first layer of the machine learning module. The first layer may analyze the images and detect various aspects that are passed to one or more subsequent layers of the machine learning module. The various layers of the machine learning module may learn, using the input images, to classify objects based on the analysis executed at each of the various layers of the machine learning module. Accordingly, the object detection module 36, when in operation, may use the machine learning module to identify objects in front of the vehicle 100 by analyzing the detected objects of the object detecting device 14 and classifying the detected objects (e.g., providing an identification of an object and a probability that the identification is correct) via the machine learning module. It is understood that the object detection module 36 may be trained to identify objects in front of the vehicle 100 in any suitable manner other than those described herein.

Figure 4:
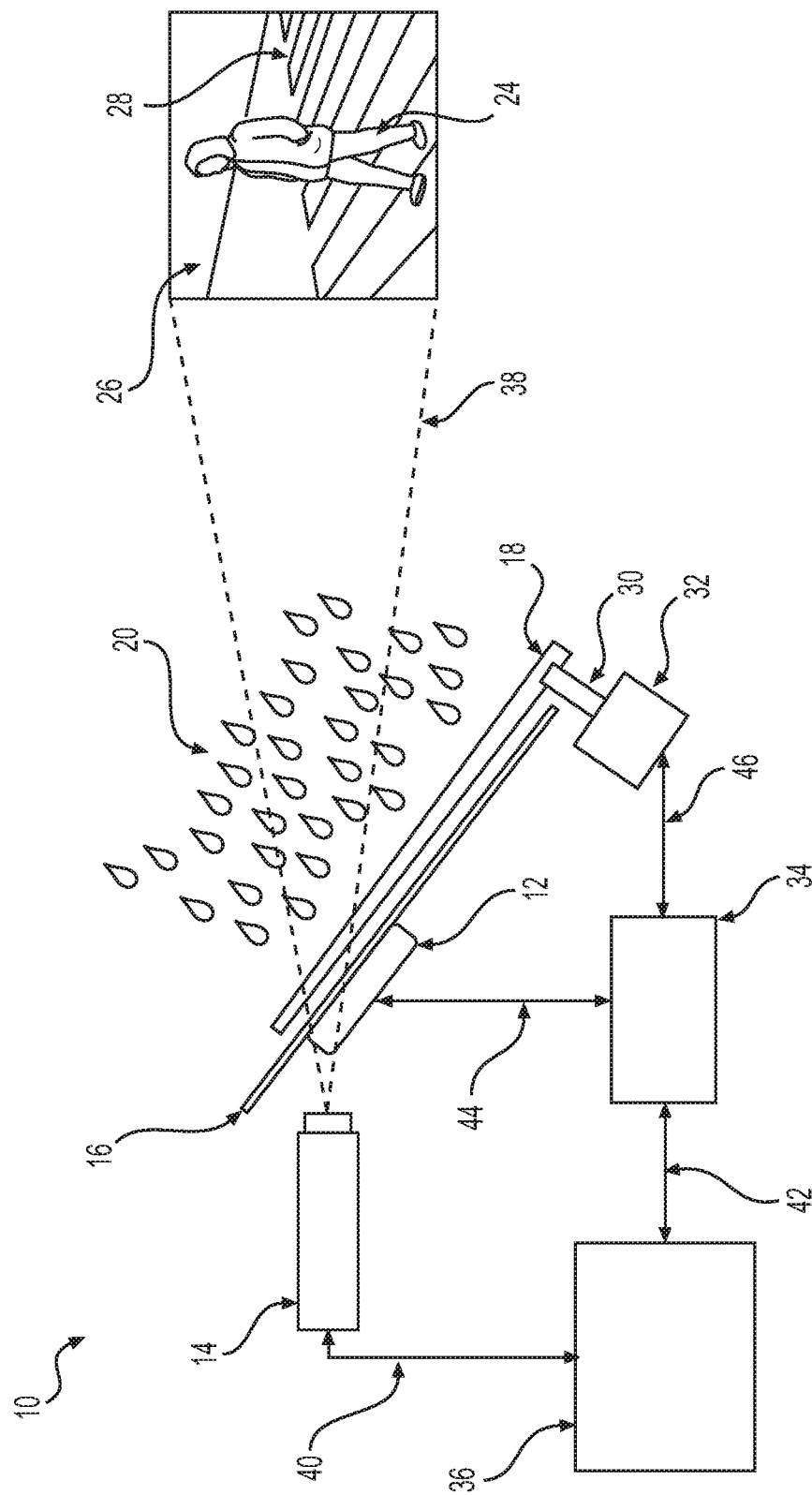
FIG. 4 generally illustrates a schematic view of the object detection system from FIGS. 1 and 2, which is in accordance with one or more embodiments of the present disclosure.

FIG. 4 illustrates a schematic view of the object detection system 10, which is in accordance with one or more embodiments. In FIG. 4, the pedestrian 24 is shown walking across the street 26, in a crosswalk 28. The pedestrian 24, in FIG. 4 is shown in the field of view 38 of the object detecting device 14. The windshield wipers 18 are driven (e.g., actuated) by windshield wiper arms 30. Each of the windshield wipers 18 may include its own windshield wiper arm 30. The wiper arms 30 may be connected to a windshield wiper motor 32. The windshield wiper motor 32 is controlled by a windshield wiper motor signal 46 sent by a windshield wiper electric control unit (ECU) 34.

The windshield wiper ECU 34 receives and/or sends additional signals, such as a rain sensor signal 44 to/from the rain sensor 12 and a windshield wiper position signal 42 to/from the object detection module 36. Additionally, or alternatively, the windshield wiper ECU 34 is configured to operate a windshield cleaning fluid dispensing system (not shown). The object detecting device 14 sends object signals 40 (e.g., representing detected objects) to the object detection module 36 for processing into (e.g., creation of) the real-time environment of the vehicle 100. It is understood that object detecting device 14 may send object signals 40 to other devices, and that object detection module 36 may be connected to and/or communicate with other sensors, signals, and/or systems.

The windshield wipers 18 may be operated (e.g., activated) by several inputs. For example, an occupant of the vehicle 100, such as a driver, activates the windshield wipers 18 by use of a manually operated switch (not shown). A signal from the manually operated switch is received by the windshield wiper ECU 34, causing the windshield wiper ECU 34 to send a windshield wiper motor signal 46 to activate the windshield wiper motor 32 and thus the windshield wipers 18. Additionally, or alternatively, the rain sensor 12 sends a rain sensor signal 44 to the windshield wiper ECU 34 that rain 20 (or other precipitation) has been detected by the rain sensor 12 on the windshield 16. The windshield wiper ECU 34 sends a windshield wiper motor signal 46 to activate the windshield wiper motor 32 and thus the windshield wipers 18.

Additionally, or alternatively, the object detecting device 14 sends an object signal 40 to the object detection module 36 that an object is present on the windshield 16 and in the field of view 38 of the object detecting device 14. The object detection module 36 may, using the windshield wiper position signal 42, determine if the windshield wipers 18 are the object in the field of view 38 of the object detecting device 14 or if another object (e.g., debris, a tree branch, bug splatter) is detected by the object detecting device 14 on the windshield 16.

When the windshield wipers 18 are operating (e.g., in various speed (frequency) modes, an intermittent mode, a single-wipe mode), the position of the windshield wiper motor 32 and by extension, windshield wiper arms 30, may be known by the windshield wiper ECU 34, via the windshield wiper motor signal 46. For example, the electrical load on the windshield wiper motor 32 may change through a cycle (e.g., from park/stowed to stop and return) of the sweep of the windshield wipers 18. The electrical load required to raise the windshield wipers 18 from a park position (such as at the base of the windshield 16) may be higher than the electrical load to return the wipers to the park position at the end of the cycle, which may be due to the effects of gravity, airflow, and/or friction of the windshield 16 against the windshield wipers 18. The windshield wiper ECU 34 may measure, monitor, and compare the electrical load in the windshield wiper motor signal 46. In doing so, the windshield wiper ECU 34 may determine the position of the windshield wiper motor 32, the windshield wiper arms 30, and the windshield wipers 18.

Additionally, or alternatively, a rotational sensor, such as a Hall Effect sensor, may be configured with the windshield wiper arms 30 and/or windshield wiper motor 32. The position of the windshield wipers 18 may be determined based on the park position of the windshield wipers 18, a max position of the windshield wipers 18, and/or an intermediate position of the windshield wipers 18. The max position of the windshield wipers 18 may be a fully deployed state. The intermediate position may be between the max position and the park position. The park position, the max position, and the intermediate position may be detected by the rotational sensor. The rotational sensor may provide a rotational signal, based on the parked position, the max position, and/or the intermediate position, to the windshield wiper ECU 34.

In one or more embodiments, the windshield wiper ECU 34 and/or the object detection module 36 may determine a position of the windshield wipers 18 using the objects detected by the object detecting device 14. For example, the object detection module 36 may analyze the detected objects and may be configured to recognize at least a portion of the windshield wipers 18 present in one or more of the detected objects. The object detection module 36 may determine a direction of movement for the windshield wipers 18, such as by comparing detected objects over time. The object detection module 36 may be configured to predict near-term changes in position of the windshield wipers 18 by identifying changes in position of the windshield wipers 18 in the detected objects.

The object detection module 36 therefore determines, based on the position of the windshield wipers 18, when the windshield wipers 18 will be in the field of view 38 of the object detecting device 14 (see FIG. 2). As a result, the object detection module 36 may disregard the windshield wipers 18, as the windshield wipers 18 move through the field of view, during the sweep. By disregarding the windshield wipers 18, the object detection module 36 may generate the real-time environmental model without the windshield wipers 18. Moreover, by disregarding the windshield wipers 18, the object detecting device 14, such as through the object detection module 36, may prevent improperly triggering the error condition.

In one or more embodiments, the object detection module 36 may process the windshield wipers 18, detected by the object detecting device 14, in the field of view 38, to disregard the windshield wipers 18 from the detected objects. In response to disregarding the windshield wipers 18, the object detection module 36 may process any remaining detected objects, such as for identification purposes. For example, upon disregarding the windshield wipers 18, the object detection module 36 may identify the pedestrian 24. This may result in the object detection module generating and/or updating a representation of the pedestrian in the real-time environment model for the vehicle 100.

In one or more embodiments, the object detection module 36 accommodates the differences in objects captured by the object detecting device 14 before and after the windshield wipers 18 have passed over the windshield 16, in the field of view 38, of the object detecting device 14. For example, the detected objects of the object detecting device 14, when rain 20 is present on the windshield 16, have different characteristics than just after the windshield wipers 18 have passed through the field of view 38, as the rain 20 is (at least temporarily) wiped from the windshield 16. The object detection module 36 may process the detected objects of the object detecting device 14 by removing and/or disregarding the rain 20 (or other precipitation).

The processing of the object detection module 36 may be related to a selective viewing. Typically, a driver of the vehicle 100 disregards the windshield wipers 18 and/or rain 20 on the windshield 16 and instead focuses on other objects in the driver's field of vision, such as the pedestrian 24. However, unlike the driver, the object detection module 36 simultaneously or substantially simultaneously processes all of the detected objects in the field of view 38 and creates a real-time environment of the detected objects relative to the vehicle 100.

Accordingly, the object detection module 36 may be configured to identify characteristics of the detected objects that are associated with the rain 20, such as raindrops, water streaks, or other suitable characteristics of the detected objects associated with the rain 20. The object detection module 36 may disregard the characteristics of the detected objects that are associated with the rain 20 in order to identify and/or analyze characteristics of the remaining detected objects, such as the pedestrian 24.

In one or more embodiments, if the windshield wipers 18 are in a position other than the park position (or otherwise properly stowed), such as if the windshield wipers 18 are "stuck" in a mid-cycle position as when the vehicle 100 is turned off before the windshield wipers 18 have a chance to return to the park position, the windshield wiper ECU 34 may provide the stuck position (or any other position) of the windshield wipers 18 to the object detection module 36 for a determination of the past, present, and future positions of the windshield wipers 18.

While only the "stuck" position of the windshield wipers 18 is described, the windshield wipers 18 may be in any suitable position during the sweep of the windshield wipers 18 (e.g., while the windshield wipers 18 art clearing the windshield 16). The windshield wiper ECU 34 may provide the positions of the windshield wipers 18 during the sweep of the windshield wipers 18 to the object detection module 36 for a determination of the past, present, and future positions of the windshield wipers 18. Additionally, or alternatively, the object detection module 36 may use the positions of the windshield wipers 18 provided by the windshield wiper ECU 34 to determine whether to selectively instruct the windshield wiper ECU 34 to modulate (e.g., increase speed, decrease speed, and/or pause) the windshield wipers 18 in order to prevent occlusion of the object detecting device 14 while the object detecting device 14 is detecting objects in front of the vehicle 100.

According to a further aspect of the object detection system 10, the object detection module 36 may be configured to signal the windshield wiper ECU 34 to operate the windshield wipers 18 based on predetermined conditions for detecting objects by the object detecting device 14. For example, the object detection module 36 may be configured to recognize certain objects (e.g., road signs, traffic lights). When such an object appears in the field of view 38 of the object detecting device 14, the object detection module 36 recognizes the object and sends a windshield wiper position signal 42 to the windshield wiper ECU 34 to selectively operate the windshield wiper motor 32 and the windshield wipers 18. For example, the object may be the pedestrian 24, a road sign, an intersection, an interchange, or any other object that meets predetermined recognized object criteria.

In one or more embodiments, a priority object may be identified by the object detection module 36. The object detection module may include a ranking system for objects. The ranking system may be predetermined and stored in memory, which may be accessed by the object detection module 36. The ranking system may include static values for objects.

Additionally, or alternatively, the ranking system may include steps for dynamically calculating values for objects. For example, in the ranking system, an object may have a baseline value. The baseline value may be increased, decreased, or remain the same depending on factors associated with the object in light of the vehicle 100, such as proximity of the object to the vehicle 100, whether the object is living or inanimate, whether the object is human or non-human, whether the object impacts an operation of the vehicle 100, such as a traffic light, etc. As such, the object detection module 36 may determine a value for a detected object based on the ranking system. The object detection module 36 may sum together the factors, based on the ranking system, to generate the value for the detected object. Depending on the value, the detected object may be a priority object.

Objects having higher rankings may be prioritized ahead of objects having lower rankings. When analyzing detected objects, the object detection module 36 may compare the detected objects against the ranking system to determine whether one or more of the detected objects may be priority objects. The comparison may be based on a look-up table approach. Additionally, or alternatively, the object detection module 36 may select the detected object having the highest ranking out of the detected objects as the priority object.

Based on the identification of the priority object, the object detection module 36 may instruct the windshield wiper ECU 34 to perform selective operation for the windshield wiper motor 32 and the windshield wipers 18. As one example of selective operation, the windshield wiper ECU 34 may increase the speed of the windshield wiper motor 32 to cause the windshield wipers 18 to more quickly approach the field of view 38 of the object detecting device 14 (and therefore depart more quickly as well).

Additionally, or alternatively, when the priority object is detected by the object detection module 36, the selective operation of the windshield wiper motor 32 and the windshield wipers 18 by the windshield wiper ECU 34 may include a decrease in the speed of the windshield wiper motor 32 to cause the windshield wipers 18 to delay the approach into the field of view 38 of the object detecting device 14. This situation may arise when, for example, a road sign is approaching and the object detection module 36 is in the process of identifying the contents of the road sign.

Additionally, or alternatively, when the priority object is detected by the object detection module 36, the selective operation of the windshield wiper motor 32 and the windshield wipers 18 by the windshield wiper ECU 34 may include a dwell or pause of the windshield wiper motor 32 to cause the windshield wipers 18 to pause at their present position on the windshield 16. This may occur when the windshield wipers 18 are outside the field of view 38 of the object detecting device 14. This situation may arise when, for example, the pedestrian 24 is detected by the object detection module 36 entering the field of view 38 of the object detecting device 14.

In one or more embodiments, the object detection module 36 may control an amount of time that the windshield wipers 18 dwell or pause, such that an amount of rain accumulating on the windshield 16 is regulated (e.g., to prevent the amount of rain from occluding the object detecting device 14). In order for the object detecting device to determine the relative position of the pedestrian 24 (e.g., or other object) and to predict a path of the pedestrian 24 (e.g., or other object) within the field of view 38 of the object detecting device 14, the object detection module 36 may signal the windshield wiper ECU 34 to increase speed of the windshield wiper motor 32, to decrease speed of the windshield wiper motor 32, to temporarily pause the windshield wiper motor 32, or to modulate the speed of the windshield wiper motor 32 (e.g., increase and decrease speeds according to a modulation pattern) until the position of the pedestrian 24 is captured by the object detecting device 14.

The object detection module 36 may then process the position of the pedestrian 24 and may determine the path (e.g., the future positions) of the pedestrian 24 within the field of view 38 of the object detecting device 14. When the processing by the object detection module 36 is complete, the object detection module 36 may signal the windshield wiper ECU 34 to resume normal operation of the windshield wiper motor 32.

According to a further aspect, the object detection module 36 may be configured to continuously and/or periodically monitor the position of the windshield wipers 18. For example, the object detection module 36 may be configured to continuously receive and process windshield wiper position signal 42 from the windshield wiper ECU 34, even if the windshield wipers 18 are not in the field of view 38 of the object detecting device 14, such as at the park position. Additionally, or alternatively, the object detection module 36 may be configured to periodically receive (e.g., sample) and process windshield wiper motor signals 46 from the windshield wiper ECU 34, such as only as the windshield wipers 18 approach the field of view 38 of the object detecting device 14 and enter the field of view 38 of the object detecting device 14. It is understood that these configurations are only exemplary and therefore not limiting.

According to a further aspect, the object detection module 36 is configured to utilize the current position data of the windshield wipers 18 to predict which portions of the field of view 38 of the object detecting device 14 will be occluded (e.g., blocked) by the windshield wipers 18 as they pass through the field of view 38 of the object detecting device 14. For example, as the windshield wipers 18 approach the field of view 38, the object detection module 36 may predict that the right side of the field of view 38 will be occluded first, then the center, and finally the left side as the windshield wipers 18 move through the field of view 38 of the object detecting device 14.

According to a further aspect, the object detection module 36 is configured to utilize the current position data of the windshield wipers 18 and/or historical windshield wipers 18 position data to predict which portions of the field of view 38 of the object detecting device 14 will be occluded (e.g., blocked) by the windshield wipers 18 as they pass through the field of view 38 of the object detecting device 14. For example, if the windshield wipers 18 are not activated for a period, the first cycle of the windshield wipers 18 could be difficult to predict. By using historical data, such as frequency of a particular setting for the windshield wipers 18 (e.g., "LOW"), the object detection module 36 is configured to predict that the windshield wipers 18 will move at the "LOW" speed setting when activated.

According to a further aspect, the object detection module 36 is configured to use the predicted position data of the windshield wipers 18 to determine the area of occlusion (e.g., area blocked by the windshield wipers 18), to remove the effect of (e.g., disregarding) the windshield wipers 18 in the field of view 38 of the object detecting device 14. As a result, the processed objects for the period that the windshield wipers 18 are in the field of view 38 of the object detecting device 14 omits the windshield wipers 18.

According to a further aspect, the current position and direction of the windshield wipers 18 is provided to the object detection module 36 via at least the rain sensor 12 and/or windshield wiper ECU 34 to predict the amount of rain 20 on the windshield 16 on either side of the moving windshield wipers 18. The object detection module 36 may be configured to process captured objects from the object detecting device 14 differently for captured objects in the field of view 38 before and after the windshield wipers 18 move across the field of view 38. Thus, the volume of rain 20 (or other precipitation) may be included in the object processing of the object detection module 36.

According to a further aspect, the object detection module 36 is configured to determine if the windshield wipers 18 are in a "stuck" or frozen state in a position apart from the park position. The object detection module 36 is configured to process position data of the windshield wipers 18 from the windshield wiper ECU 34 to determine the park position and therefore determine how far the windshield wipers 18 are from the park position and when the windshield wipers 18 will enter the field of view 38 of the object detecting device 14.

According to a further aspect, the object detection module 36 is configured to receive the rain sensor signal 44 from the rain sensor 12. The rain sensor signal 44 may contain information regarding the volume of rain 20 present on the windshield 16. Based at least on this information, the object detection module 36 may predict (e.g., estimate) the amount of rain 20 on the windshield, particularly in the field of view 38 of the object detecting device 14. The prediction of the amount of rain 20 may be factored into object processing by the object detection module 36 to remove the effect of the rain 20 from the processed objects captured by the object detecting device 14. For example, based on the amount of rain 20 detected by the rain sensor 12, the object detection module 36 may detect and prevent the rain 20 from the occluding the captured objects of the object detecting device 14.

According to a further aspect, the object detection module 36 is configured to adjust and/or modulate the speed (e.g., frequency), of the windshield wipers 18 using at least windshield wiper ECU 34 and/or windshield wiper motor signal 46 in order to optimize the capturing of objects in the field of view 38 of the object detecting device 14. The object detection module 36 is configured to identify an object or characteristic of an object (e.g., a green road sign, an amber caution light), and the object detection module 36 is configured to use the windshield wiper motor signal 46 to direct the windshield wiper motor 32 to either speed up, dwell/pause, or slow down the movement of the windshield wipers 18 across the field of view 38 of the object detecting device 14. The movement of the windshield wipers 18 may therefore be used to remove more rain 20 from the field of view 38 of the object detecting device 14, for example. In another example, the windshield wipers 18 may pause outside of the field of view 38 of the object detecting device 14 so that the windshield wipers 18 do not occlude the field of view 38 of the object detecting device 14.

According to a further aspect, the object detection module 36 is configured to modulate the speed of the windshield wipers 18 for a single event as determined by the object detection module 36. For example, if vehicle 100 is entering an intersection, based on the real-time environment detected by and created by the object detection module 36, the speed of the windshield wipers 18 may be adjusted to detect how objects in the real-time environment are moving relative to the vehicle 100. If another vehicle is approaching the intersection that the vehicle 100 is entering (e.g., against the traffic control of the intersection), the object detection module 36 may slow the speed of the windshield wipers 18 to capture the movement of the other vehicle. Additionally, or alternatively, if the object detection module 36 detects, via the rain sensor 12, that rain is accumulating on the windshield 16, the object detection module 36 may speed up the windshield wipers 18 such that the object detecting device 14 and/or the driver/user may have a clearer view of the intersection and the other vehicle approaching, allowing for an appropriate response by the vehicle 100.

According to a further aspect, the object detection module 36 is configured to modulate the speed of the windshield wipers 18 based at least on the speed of one or more objects detected by the object detecting device 14 and processed/created in the real-time environment. For example, if an object (an oncoming vehicle) is approaching the vehicle 100 at a high rate of speed (such as on a two-lane road with opposing traffic), in a fore/aft direction, but laterally the oncoming vehicle is detected as not having a high rate of speed, then the object detection module 36 may modulate (e.g., pause, accelerate, or slow), the windshield wipers 18 over the small portion of the windshield 16 that the object detecting device 14 perceives the oncoming vehicle as occupying.

Additionally, or alternatively, if the other vehicle were not approaching the vehicle 100, but rather overtaking the vehicle 100 on the left, for example, the object detection module 36 may modulate the speed of the windshield wipers 18 over a larger portion of the windshield 16 that the object detecting device 14 perceives the overtaking vehicle as occupying. For example, the windshield wipers 18 may be modulated over the left side of the windshield 16 that the object detecting device 14 utilizes, but as the other vehicle moves from the left of the vehicle 100 to directly in front of the vehicle 100, the area of the windshield 16 may shift more centrally, with respect to the object detecting device 14.

According to a further aspect, the object detection module 36 may be configured to communicate with and/or receive information from a larger system, such as vehicle-to-everything (V2X). V2X may include communication to/from the object detection module 36 and/or the vehicle 100. In other words, the object detection module 36 may be configured to directly receive V2X communication, or indirectly, such as via vehicle 100, a mobile device, or other wireless communication systems. The object detection module 36 may receive information via V2X of approaching situations and modulate the windshield wipers 18 accordingly. For example, the information may include road construction.

The road construction may adversely affect the travel of vehicle 100 due to increased congestion, lane closures, and/or possible detours and alternate routes. The information about the road construction received by the object detection module 36 may, depending upon other factors, result in the object detection module 36 modulating the movement of the windshield wipers 18. To add to the example, if the current weather conditions include heavy precipitation (e.g., rain 20); the object detection module 36 receives an appropriate signal from the rain sensor 12. The object detecting device 14 may require more frequent passes of the windshield wipers 18 in order to more accurately perceive (e.g., detect), objects in the field of view 38. The object detection module 36 may then, based on the signal received from the rain sensor 12 and/or the V2X information, modulate the windshield wipers 18 to a higher frequency setting to clear the rain 20 from the windshield 16 and permit the object detecting device 14 to capture more information about the approaching road construction situation.

According to a further aspect, the object detection module 36 may be configured for V2X communication. As described herein, V2X communication includes at least vehicle-to-vehicle, vehicle-to-pedestrian, vehicle-to-device, and/or vehicle-to-grid communication. V2X communication may occur using one or more wireless local area networks (WLANs) and may include an ad-hoc network that develops when more than one V2X communication-capable device approaches another (e.g., within the ad-hoc network range). For example, V2X communication may occur via cellular V2X ("C-V2X"), which may operate on a cellular network. Additionally, or alternatively, V2X communication may occur via dedicated short-range communications ("DSRC"), which may operate under a wireless communication standard, such as 802.11p. As another example, in traffic, a number of vehicles are in close proximity to each other, such that an ad-hoc V2X network is formed, at least among the vehicles equipped for V2X communication. The V2X communication may include data such as each vehicle's current speed and destination. The object detection module 36 may use some or all of this information to determine the status of nearby objects, such as those already detected by the object detecting device 14 and/or those not yet detected by the object detecting device 14. Additionally, or alternatively, the object detection module 36 may compare/compile data obtained by the object detecting device 14 with V2X communication data pertaining to the same detected object. For example, the object detection module 36 may receive data about an oncoming vehicle that includes its bearing and speed from the object detecting device 14 and based on V2X communication with the oncoming vehicle, receive its bearing, speed, and additional information that the oncoming vehicle is planning to turn. The object detection module 36 processes this combined data and updates the real-time environmental model used by the vehicle 100.

According to a further aspect, an occupant of the vehicle 100 may manually activate the cleaning fluid system for the windshield 16, causing cleaning fluid (e.g., windshield washer fluid), to occlude at least a portion of the field of view 38 of the object detecting device 14. However, the object detection module 36, using the object detecting device 14 that generates a real-time environment and based on detected objects and/or information received from V2X communication, may override the manual windshield wash command from the occupant. Additionally, or alternatively, the object detection module 36 may permit the dispensing of the washing fluid on the windshield 16 and/or modulate the speed of the windshield wipers 18 to a higher speed, lower speed, or pause the windshield wipers 18.

In one or more embodiments, the object detection module 36 determines, based on the object detecting device 14, that the windshield 16 is sufficiently dirty, and automatically causes dispensing of washing fluid, from the cleaning system, onto the windshield 16. For example, in the field of the view 38 of the object detecting device 14, contaminants may accumulate. Based on measurements from the object detecting device 14, the object detection module 36 may determine that the windshield 16 requires a cleaning cycle. The determination may be based on comparing measurements from the object detecting device 14, such as a present measurement to a measurement from immediately after completion of a prior cleaning cycle.

Figure 5:
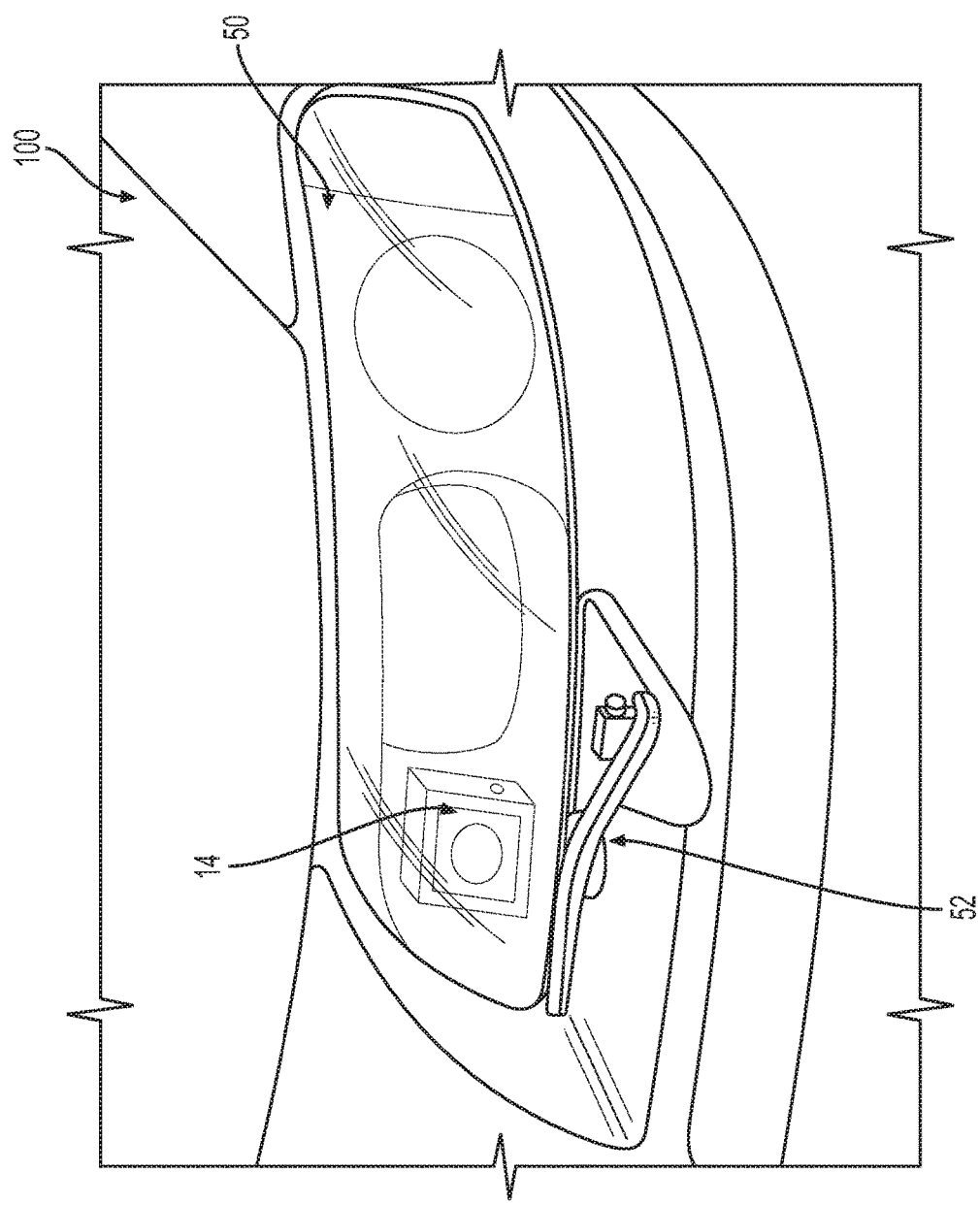
FIG. 5 generally illustrates a perspective view of a vehicle headlamp of an object detection system, according to one or more embodiments of the present disclosure.

Referring generally to FIG. 5, the vehicle 100 includes a headlamp 50, which is in accordance with one or more embodiments. FIG. 5 includes an implementation of the object detection system 10 for the headlamp 50. It is understood that the vehicle 100 may include more than one headlamp 50. The headlamp 50 includes the object detecting device 14, the object detection module 36, and a headlamp wiper system 52. Additionally, or alternatively, the headlamp 50 may include the rain sensor 12 and/or other sensors configured to monitor characteristics of the headlamp 50, such as the cleanliness of a lens of the headlamp 50.

The object detecting device 14 may be configured within a portion of the headlamp 50. The object detecting device 14 may be positioned behind a protective cover, such as a lens, of the headlamp 50. The wiper system 52 may include a sweep (e.g., clearing path) that includes an area of the protective cover over the object detecting device 14. As such, the wiper system 52 may occlude the object detecting device 14.

The headlamp wiper system 52 includes a headlamp wiper, which may similar features, and operations, to the windshield wipers 18. The headlamp wiper system 52 may be configured with a headlamp cleaning fluid dispensing system (not shown). The headlamp cleaning fluid dispensing system may be configured to operate with a cleaning fluid system for the windshield 16. Additionally, or alternatively, the headlamp cleaning fluid dispensing system may be configured to operate independently of the cleaning fluid system for the windshield 16. Additionally, or alternatively, the headlamp cleaning fluid dispensing system may be configured to operate selectively (e.g., the headlamp wiper may operate with or without the headlamp cleaning fluid dispensing system).

Locating the object detecting device 14 in the headlamp 50 may increase, supplement, and/or improve object detection, such as by increasing and improving a field of view of the object detecting device 14. Related to this, locating the object detecting device 14 may reduce a blind spot for the object detecting device 14. This may be because a body panel, such as a hood, may not restrict a viewing angle from the object detecting device 14 to a ground surface, such as a road. It is understood that the headlamp implementation of the object detecting device 14 of FIG. 5 may be used in conjunction with or in place of other implementations of the object detecting device 14, such as the windshield implementation according to FIGS. 1 through 4.

Additionally, or alternatively, implementing object detecting devices 14 in a pair of headlamps 50 for the vehicle 100 may provide for stereoscopic object detection, which may further increase, supplement, and/or improve object detection capabilities. Furthermore, while FIG. 5 illustrates headlamp 50, it is understood that the object detecting device 14 may be implemented in a taillight, or other suitable light, of the vehicle 100.

Figure 6A:
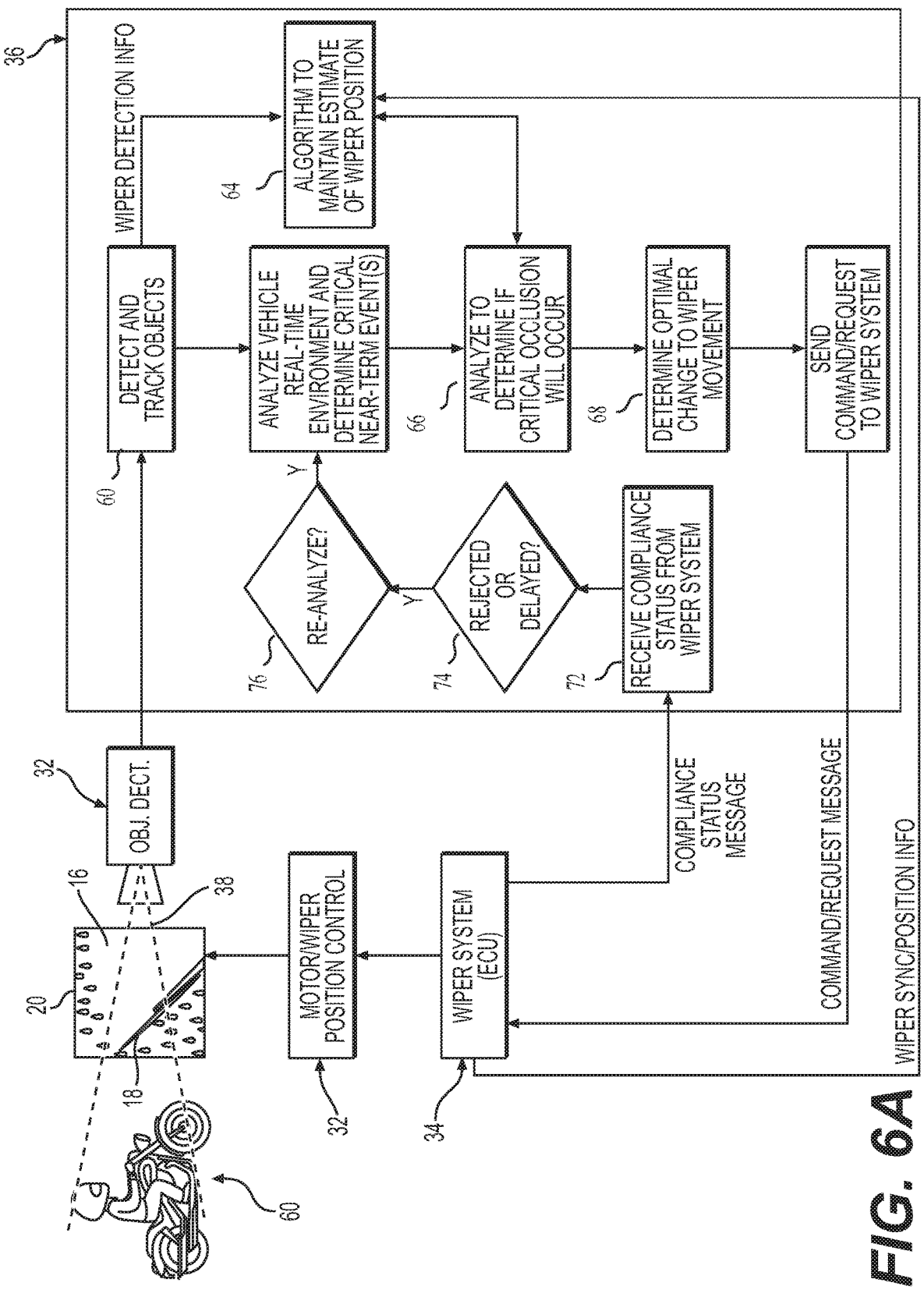
FIG. 6A generally illustrates a flow chart of an object detection system, according to one or more embodiments of the present disclosure.
Figure 6B:
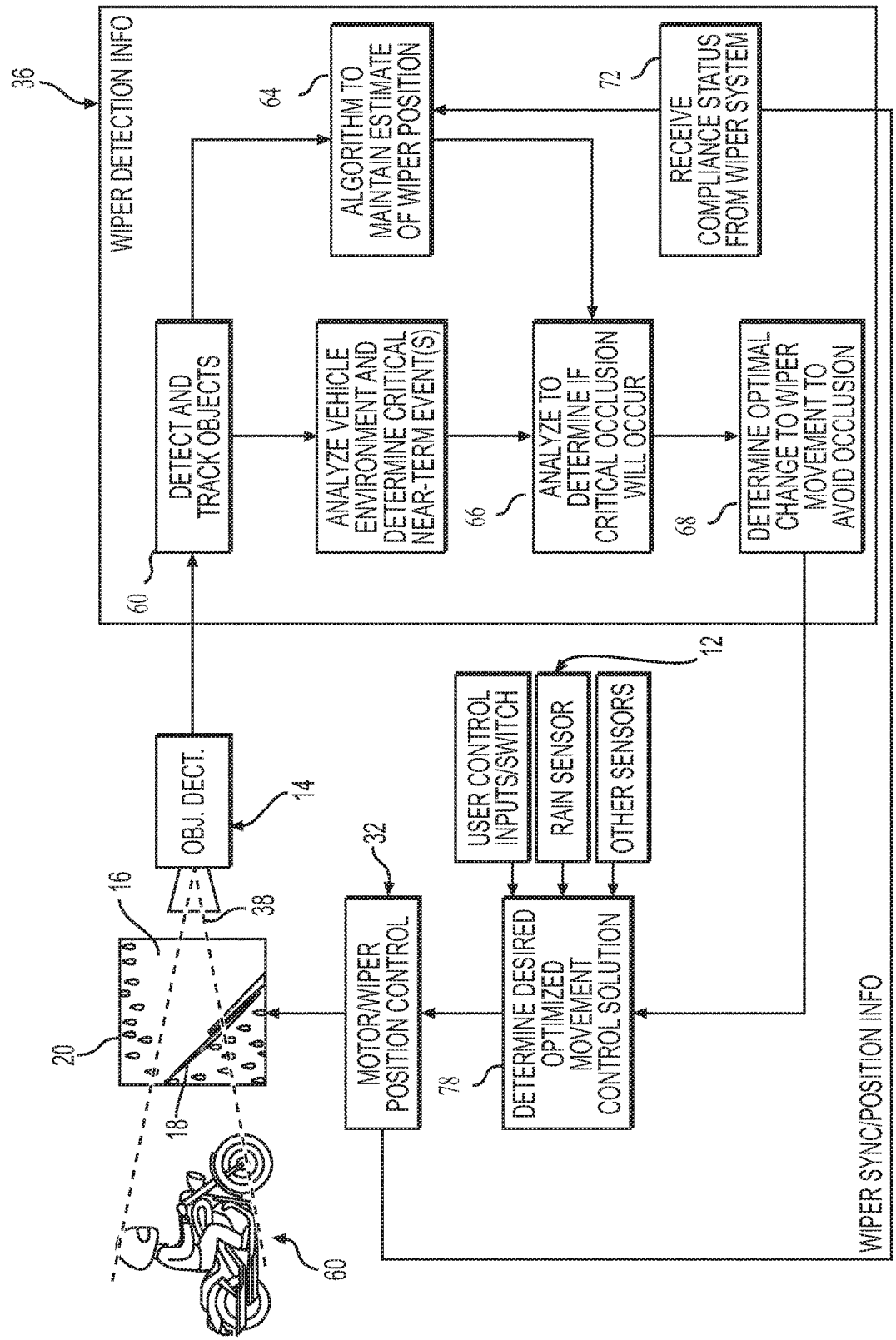
FIG. 6B generally illustrates a flow chart of an object detection system, according to one or more embodiments of the present disclosure.

As illustrated in the flowcharts of FIGS. 6A-6B, two exemplary embodiments of the object detection system 10 are shown. Referring generally to FIG. 6A, the object detection module 36 includes a step 60, the detection and tracking of objects. The object detecting device 14, in this example, includes a motorcyclist 58 within the field of view 38 that extends through the windshield 16 and further includes the windshield wiper 18 clearing away rain 20. The motorcyclist 58, detected by the object detection module 36 using the object detecting device 14, is analyzed by the object detection module 36 and used in the generation of the real-time environmental model to determine, among other things, critical near-term events. For example, whether the motorcyclist 58 is moving toward or away from the object detecting device 14 (and the vehicle 100). The step 60 also includes detecting the position of the windshield wipers 18.

An algorithm (e.g., computer instructions), may be used to determine the position of the windshield wiper 18 on the windshield 16 in step 64. In step 66, the position of the windshield wiper determined in step 64 is used to determine, by the object detection module 36, whether the windshield wipers 18 will occlude (e.g., block), the field of view 38 of the object detecting device 14. In step 68, the object detection module 36 determines the optimal change to the movement (e.g., travel across the windshield 16), of the windshield wiper 18. For example, the optimal change may include modulating the frequency of the windshield wipers 18 across the windshield 16.

Once the object detection module 36 has determined the optimal change to the movement of the windshield wipers 18, the object detection module 36 sends a command signal (s) to the windshield wiper ECU 34 to operate the windshield wipers 18 according to the predetermined optimal change. The windshield wiper ECU 34 operates the windshield wiper motor 32 according to the predetermined optimal change provided by the object detection module 36. The windshield wiper ECU 34 sends a compliance signal back to the object detection module 36 and in step 72, the compliance signal is received by the object detection module 36. In step 74, the object detection module 36 determines whether the windshield wipers 18 were operated according to the optimal change.

If the windshield wipers 18 were not operated according to the optimal change, in step 76, the object detection module 36 may re-analyze the position of the windshield wipers 18 according to the real-time environment as described in step 62, and the method may continue for another cycle.

Referring generally to FIG. 6B, the object detection module 36 includes the step 60, the detection and tracking of objects. The object detecting device 14, in this example, includes the motorcyclist 58 within the field of view 38 that extends through the windshield 16 and further includes the windshield wipers 18 clearing away rain 20.

The motorcyclist 58, detected by the object detection module 36 using the object detecting device 14, is analyzed by the object detection module 36 and used in the generation of the real-time environmental model to determine, among other things, critical near-term events. For example, whether the motorcyclist 58 is moving toward or away from the object detecting device 14.

The step 60 also includes detecting the position of the windshield wipers 18. An algorithm may be used to determine the position of the windshield wipers 18 on the windshield 16 in step 64. In step 66, the position of the windshield wiper determined in step 64 is used to determine, by the object detection module 36, whether the windshield wipers 18 will occlude the field of view 38 of the object detecting device 14. In step 68, the object detection module 36 determines the optimal change to the movement of the windshield wipers 18.

In step 78, at least one input is received to determine the optimal change to the movement of the windshield wipers 18. One input may be a manual driver/user operated windshield wiper switch (not shown). Another input may be the rain sensor 12. Other inputs may include other sensors (e.g., dirt sensor). In step 78, all of these inputs are weighed by the object detection module 36 according to predetermined instructions. The predetermined instructions may include prioritizations of one input over another input.

As described above, a manual command to activate the windshield wipers 18 may be overridden or paused if the object detection module 36 determines, based on its real-time environmental model, that occlusion of the object detecting device 14 should be avoided. A signal received by the rain sensor 12 that heavy precipitation is accumulating on the windshield 16 may result in a determination by the object detection module 36 that the windshield wipers 18 activate, despite a command not to operate from the driver/user. Other combinations are contemplated, such as, but not limited to, a manual low speed for the windshield wipers 18 that is increased automatically to a higher speed by the object detection module 36. Additionally, or alternatively, a manual high speed for the windshield wipers 18 that is on paused for a predetermined period by the object detection module 36 based at least on the real-time environment model and the objects detected by the object detecting device 14.

The system, methods, and/or processes described above, and steps thereof, may be realized in hardware, software or any combination of hardware and software suitable for a particular application. The hardware, software, or suitable combination may be disposed within the vehicle 100, remotely located from the vehicle 100 (e.g., in a cloud computing system, on a handheld computing device, laptop computer device, other suitable computing system or device, or a combination thereof), or partially disposed within the vehicle 100 and partially remotely located from the vehicle 100. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors, or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Many modifications and variations of the present invention are possible in light of the above teachings and may be practiced otherwise than as specifically described while within the scope of the appended claims. For example, an object detection system, in accordance with one or more embodiments, may be implemented in a bumper, a tailgate, a side-view mirror, a rear windshield, or another suitable portion of a vehicle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium may be any device that may, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A object detection system for a vehicle, the vehicle including a windshield disposed within a line of vision of a driver, the object detection system comprising:
   an object detecting device located behind an interior surface of the windshield, the object detecting device configured for detecting an object outside of the vehicle;
   a windshield wiper controller configured to articulate a wiper relative to a clearing path defined along an exterior surface of the windshield, the clearing path at least partially traversing the object detecting device such that an area on an underside of the wiper occludes the object detecting device when positioned thereover; and
   an object detection module configured to selectively control the wiper to prevent the wiper from occluding the object detecting device while the object detecting device is detecting the object.

2. The object detection system of claim 1, wherein the object detection module is configured, while the object detecting device is detecting the object, to control a position of the wiper along the clearing path to portions of the clearing path outside a field of view of the object detecting device.

3. The object detection system of claim 1, wherein the object detection module is configured, while the object detecting device is detecting the object, to modulate a speed of the wiper to prevent the wiper from occluding the object detecting device.

4. A object detection system for a vehicle, comprising:
   an object detecting device located behind an interior surface of a windshield, the object detecting device configured for generating an object signal for an object detected outside of the vehicle;
   a windshield wiper controller configured to articulate a wiper along a clearing path on an exterior surface of the windshield, the wiper occluding the object detecting device when sweeping over an occluded portion of the clearing path; and
   an object detection module configured to generate from the object signal an environmental model having a representation of the object, the object detection module configured to disregard the wiper while the wiper traverses the occluded portion.

5. The object detection system of claim 4, wherein the object detection module is configured, while the object detecting device is detecting the object, to modulate a speed of the wiper to prevent the wiper from occluding the object detecting device.

6. The object detection system of claim 5, wherein the object detection module is configured to modulate the speed of the wiper by one of increasing the speed, decreasing the speed, or pausing the wiper.

7. The object detection system of claim 4, wherein the object detection module is configured, while the object detecting device is detecting the object, to control a position of the wiper along the clearing path to portions of the clearing path outside a field of view of the object detecting device.

8. The object detection system of claim 4, wherein the windshield is positioned within a field of vision of a driver of the vehicle.

9. The object detection system of claim 4, wherein the object detection system is configured to autonomously or semi-autonomously drive the vehicle.

\* \* \* \* \*